(12) United States Patent
He et al.

(10) Patent No.: US 10,473,553 B2
(45) Date of Patent: Nov. 12, 2019

(54) SYSTEM AND A METHOD FOR PERFORMING MODAL ANALYSIS ON A STRUCTURE

(71) Applicant: City University of Hong Kong, Kowloon (HK)

(72) Inventors: Yuncheng He, Kowloon (HK); Qiusheng Li, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 507 days.

(21) Appl. No.: 14/632,087

(22) Filed: Feb. 26, 2015

(65) Prior Publication Data

US 2016/0252423 A1    Sep. 1, 2016

(51) Int. Cl.
*G01M 7/02* (2006.01)
(52) U.S. Cl.
CPC .................................. *G01M 7/025* (2013.01)

(58) Field of Classification Search
CPC ...................................................... G01M 7/025
See application file for complete search history.

(56) References Cited

U.S. PATENT DOCUMENTS

2013/0297266 A1*  11/2013  Brincker ................ G01H 1/006
                                                                    703/1

* cited by examiner

*Primary Examiner* — Yu-Hsi D Sun
(74) *Attorney, Agent, or Firm* — Renner Kenner Greive Bobak Taylor & Weber

(57) ABSTRACT

A method for performing modal analysis on a structure includes the steps of dividing the structure into a plurality of layers each having an individual centroid; determining a movement of a testing point on each layer with respect to the individual centroid of the plurality of layers, wherein the testing point is at a predetermined distance from the individual centroid along a testing plane; and processing the movement of the testing point on each layer to determine a modal response of the structure. A system for performing modal analysis on a structure includes a movement detection module and a processing module for carrying out the method.

27 Claims, 4 Drawing Sheets

SYSTEM AND A METHOD FOR PERFORMING MODAL ANALYSIS ON A STRUCTURE

TECHNICAL FIELD

The present invention relates to a system and a method for performing modal analysis on a structure, and particularly, although not exclusively, to a system and method to determine a modal response of the vibration of an architectural structure.

BACKGROUND

Architectural structures may be built in accordance to various requirements such as appearance, structural strength, and other factors associated with the geographical position. With the advanced technology, some these structures may be deployed at a position which has occasional challenges. For example a tower built approximated to an earthquake zone or a marine platform that may experience waves in the ocean.

To analyse the structural response of these structures, modal analysis may be performed to study the properties of structures under vibration excitation. By further studying the modal analysis results, the structure may be improved based on these challenges experienced by the structure so as to avoid severe damage due to different types of vibration excitation.

SUMMARY OF THE INVENTION

In accordance with a first aspect of the present invention, there is provided a method for performing modal analysis comprising the steps of:
  dividing the structure into a plurality of layers each having an individual centroid;
  determining a movement of a testing point on each layer with respect to the individual centroid of the plurality of layers, wherein the testing point is at a predetermined distance from the individual centroid along a testing plane; and
  processing the movement of the testing point on each layer to determine a modal response of the structure.

In an embodiment of the first aspect, the testing point on each of the plurality of layers is a single testing point.

In an embodiment of the first aspect, further comprising the step of determining a plurality of instantaneous vibration directions of the testing point on each of the plurality of layers of the structure.

In an embodiment of the first aspect, the step of determining a plurality of instantaneous vibration directions includes processing a plurality of modal components of the modal response obtained in the testing point on each of the plurality of layers.

In an embodiment of the first aspect, the plurality of modal components are synchronous and without phase distortion.

In an embodiment of the first aspect, the plurality of modal components are obtained by applying a linear/zero phase filtering.

In an embodiment of the first aspect, further comprising the step of determining a plurality of instantaneous vibration amplitudes corresponding to the testing point on each of the plurality of layers.

In an embodiment of the first aspect, the plurality of instantaneous vibration amplitudes are determined by applying Hilbert Transform to each of the plurality of modal components.

In an embodiment of the first aspect, further comprising the step of identifying a torsional mode and/or a swaying mode of a movement of the structure.

In an embodiment of the first aspect, a direction of the movement of the testing point is represented as an angle defined by both a predetermined reference direction with respect to the individual centroid and a shortest distance between the testing point and the individual centroid of the respective layer along the testing plane.

In an embodiment of the first aspect, whereupon a track of movement of at least one of the plurality of modal components renders a steady linear/arc distribution and the corresponding instantaneous vibration direction of the testing point equals to the angle or represents a harmonious vibration with respect to the angle as a center value, identifying the movement of the structure as the torsional mode of movement.

In an embodiment of the first aspect, whereupon identifying the torsional mode of the movement of the structure, determining a torsional duration and an instantaneous amplitude information by computing a linear response corresponding to a radius of the movement of the testing point on each of the plurality of layers.

In an embodiment of the first aspect, further comprising the step of representing an amplitude of a function of a torsional mode shape by an amplitude of the modal response corresponding to each of the radius of the movement of the testing point on each of the plurality of layers.

In an embodiment of the first aspect, the sign of the amplitude of a function of a torsional mode shape represents a sign of a correlation coefficient of the modal response in time domain associated with a referenced testing point and a plurality of different testing points on different testing planes.

In an embodiment of the first aspect, further comprising the step of determining an order of the torsional mode of the movement by identifying a number of nodes.

In an embodiment of the first aspect, the number of nodes is obtained by summation of identified nodes represented by a same order of modal component of two of the plurality of testing points in a same direction if the two testing points includes opposite phases or a negative correlation coefficient of a modal response in time domain.

In accordance with a first aspect of the present invention, there is provided a system for performing modal analysis on a structure comprising:
  a movement detection module arranged to determine a movement of a testing point on each of a plurality of layers divided in a structure with respect to an individual centroid of each of the plurality of layers, wherein the testing point is at a predetermined distance from the individual centroid along a testing plane; and
  a processing module arranged to process the movement of the testing point on each layer to determine a modal response of the structure.

In an embodiment of the second aspect, the testing point on each of the plurality of layers is a single testing point.

In an embodiment of the second aspect, the movement detection module includes a multi-axis accelerometer.

In an embodiment of the second aspect, the movement detection module includes a plurality of single-axis accelerometer orthogonally configured with respect to each other.

In an embodiment of the second aspect, the movement detection module includes a plurality of detectors each positioned at the testing point on each of the plurality of layers and arranged to detect the movement of the testing point on each of the plurality of testing planes.

In an embodiment of the second aspect, the processing module is further arranged to determine a plurality of instantaneous vibration directions of the testing point on each of the plurality of layers of the structure.

In an embodiment of the second aspect, the processing module is arranged to determine the plurality of instantaneous vibration directions based on processing a plurality of modal components of the modal response obtained in the testing point on each of the plurality of layers.

In an embodiment of the second aspect, the plurality of modal components are synchronous and without phase distortion.

In an embodiment of the second aspect, the processing module is arranged to apply a linear/zero phase filtering so as to obtain the plurality of modal components.

In an embodiment of the second aspect, the processing module is further arranged to determine a plurality of instantaneous vibration amplitudes corresponding to the testing point on each of the plurality of layers.

In an embodiment of the second aspect, the processing module is arranged to apply Hilbert Transform to each of the plurality of modal components so as to determine the plurality of instantaneous vibration amplitudes.

In an embodiment of the second aspect, the processing module is further arranged to identify a torsional mode and/or a swaying mode of a movement of the structure.

In an embodiment of the second aspect, a direction of the movement of the testing point is represented as an angle defined by both a predetermined reference direction with respect to the individual centroid and a shortest distance between the testing point and the individual centroid of the respective layer along the testing plane.

In an embodiment of the second aspect, whereupon a track of movement of at least one of the plurality of modal components renders a steady linear/arc distribution and the corresponding instantaneous vibration direction of the testing point equals to the angle or represents a harmonious vibration with respect to the angle as a center value, the processing module is arranged to identify the movement of the structure as the torsional mode of the movement.

In an embodiment of the second aspect, whereupon the torsional mode of the movement of the structure is identified, the processing module is further arranged to determine a torsional duration and an instantaneous amplitude information by computing a linear response corresponding to a radius of the movement of the testing point on each of the plurality of layers.

In an embodiment of the second aspect, an amplitude of a function of a torsional mode shape represents an amplitude of the modal response corresponding to each of the radius of the movement of the testing point on each of the plurality of layers.

In an embodiment of the second aspect, the sign of the amplitude of a function of a torsional mode shape represents a sign of a correlation coefficient of the modal response in time domain associated with a referenced testing point and a plurality of different testing points on different testing planes.

In an embodiment of the second aspect, the processing module is further arranged to determine an order of the torsional mode of the movement by identifying a number of nodes.

In an embodiment of the second aspect, the number of nodes is obtained by summation of identified nodes represented by a same order of modal component of two of the plurality of testing points in a same direction if the two testing points includes opposite phases or a negative correlation coefficient of a modal response in time domain.

In an embodiment of the second aspect, the structure includes an architectural structure.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, there are several ways to test and identify a torsional vibration mode. For example, a Finite Element Model (FEM) may be established, in which the vibration mode may be identified by obtaining the mode shape and the corresponding predetermined frequency of the torsional mode in a simulation result, and by comparing the frequency results obtained from both a testing and the simulation results.

This method requires the geometrical and physical information of the testing object/structure, hence the testing cycle/period is long and is expensive. In addition, these exist a relatively large deviation between the tested and the simulation results, therefore the results are not suitable for an effective identification of the (torsional) vibration mode.

Alternatively, detectors such as accelerometers may be deployed at two testing points which are symmetrical to the centroid along a testing plane (the centroid of a testing plane is considered as not significantly deviating from a torsional center). The deployed accelerometers have a same testing direction which is perpendicular to the shortest distance in between. The corresponding torsional response modal components may be obtained by subtracting the time responses of the two testing points and then divided by the distance between the two testing points, followed by a subsequent analysis.

This method requires synchronized response information obtained in both testing points. Structural obstacles (such as walls) usually exist in real structures which increase the difficulties and the cost in different testing procedures. In addition, such method is only suitable for an identification of a first order torsional mode in tall buildings.

Figure 1:
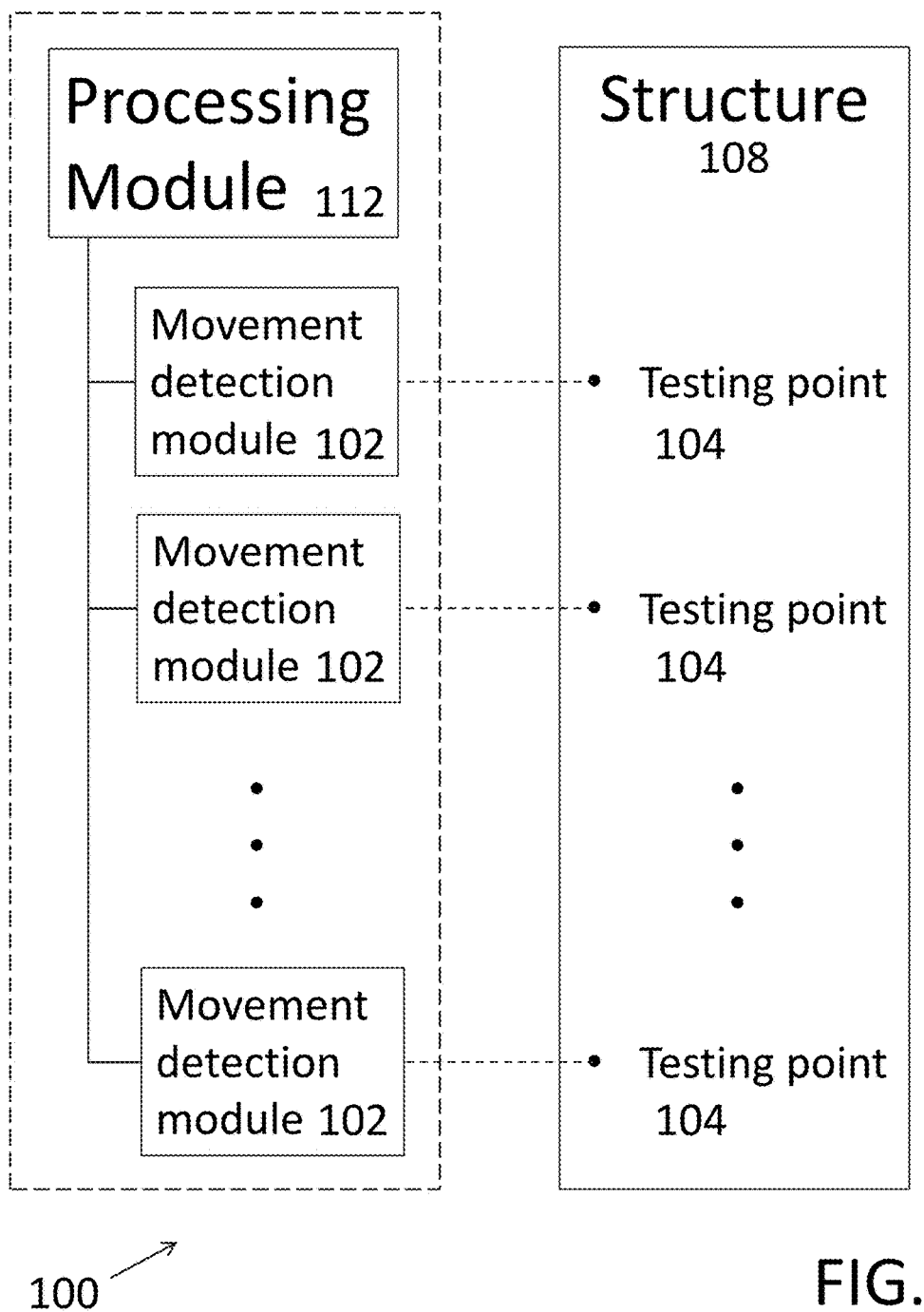
FIG. 1 is a block diagram of a system for performing modal analysis on a structure in accordance with one embodiment of the present invention.
Figure 2:
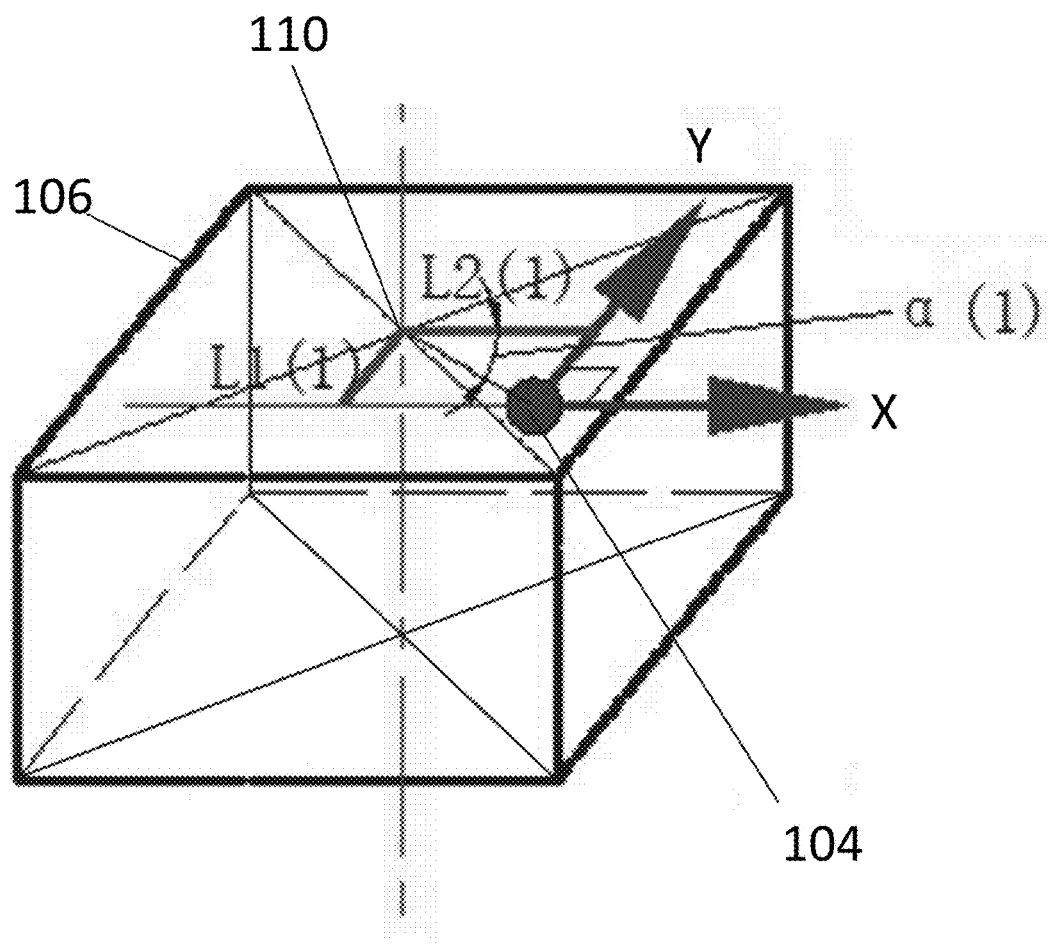
FIG. 2 is an illustration showing a three-dimensional configuration of a movement detection module of the system of FIG. 1 on a testing plane.
Figure 3:
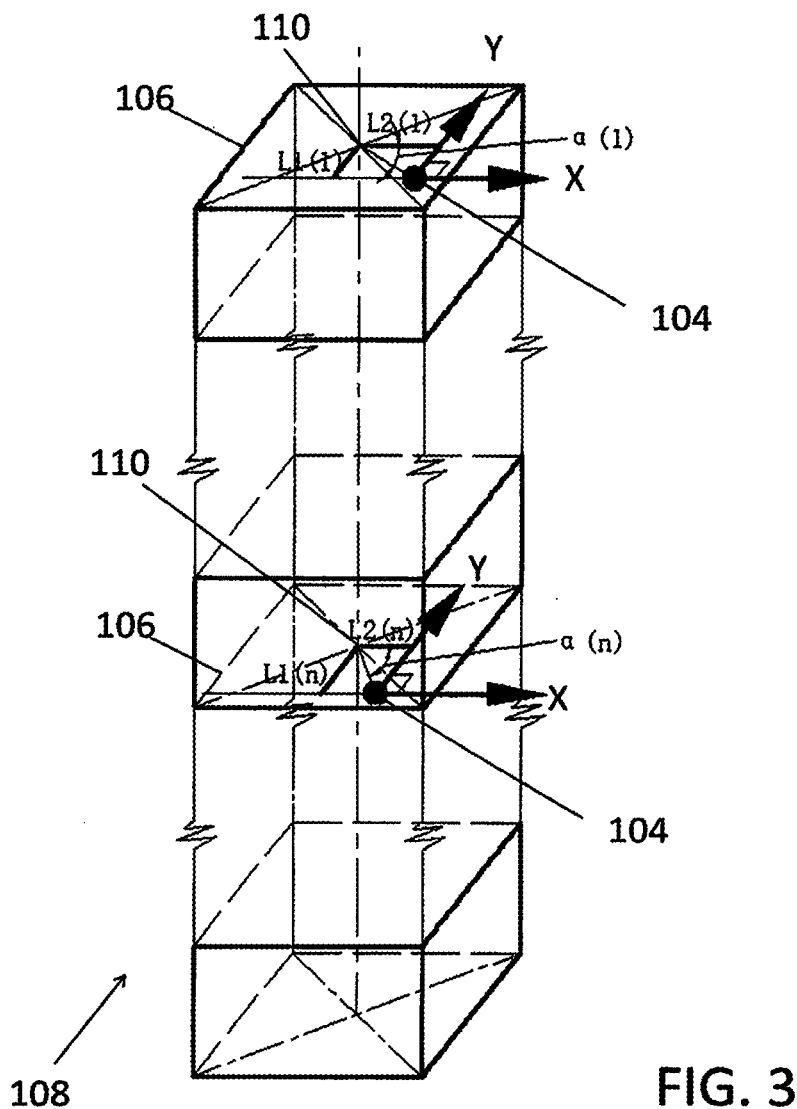
FIG. 3 is an illustration showing a three-dimensional configuration of a plurality of movement detection modules of the system of FIG. 1 on a plurality of testing plane in FIG. 2.

With reference to FIGS. 1 to 3, there is shown an embodiment of a system 100 for performing modal analysis on a structure comprising: a movement detection module 102 arranged to determine a movement of a testing point 104 on each of a plurality of layers 106 divided in a structure 108 with respect to an individual centroid 110 of each of the plurality of layers 106, wherein the testing point 104 is at a predetermined distance from the individual centroid 110 along a testing plane 106; and a processing module 112 arranged to process the movement of the testing point 104 on each layer 106 to determine a modal response of the structure 108.

In this embodiment, the structure 108 is divided into a plurality of (testing) layers 106. For example, a vertical structure such as a tower or a building may be divided vertically into a plurality of testing layers which may include one or more stories/level/floor in each of the testing layers, or even one or more testing layers may be defined within each of the stories in the tower. In an alternative example, a substantially horizontal structure such as a bridge may be divided horizontally into a plurality of testing planes/layers. Other approaches such as different numbers or orientations of the testing layers 106 divided within the structure 108 may be also suitable according to different testing and analysis requirements.

Each of the plurality of the layers 106 has an individual centroid 110 along a testing plane 106 as shown in FIGS. 2 and 3. The centroid 110 of the testing layer 106 is preferably considered as the physical/structural centroid of the testing layer 106, in which the center of mass of the testing layer 106 is located at or approximate to the centroid 110. The centroid 110 may also be a geometrical centroid of the testing plane/layer 106 if the physical properties of the testing layer 106 are substantially uniform across the layer 106.

On the testing plane/layer 106, a testing point 104 is defined where a movement detection module 102 may be deployed at the testing point 104. Preferably, the testing point 104 is at a predetermined distance from the centroid 110 along the testing plane 106, and the testing point 104 on each layer 106 is a single testing point 104, which means that only a single testing result in each layer is obtained. Preferably, the movement detection module 102 includes a multi-axis accelerometer arranged to detect at least two orthogonal testing directions (such as directions X and Y as shown in the Figures), such that the movement of the testing point 104 along the testing directions on each layer 106 may be detected by the movement detection module 102. Alternatively, the movement detection module 102 includes a plurality of (and preferably two) single-axis accelerometers orthogonally configured with respect to each other, the orthogonally configured single-axis accelerometers are arranged to detect a movement of the testing points 104 along directions X and Y on each layer 106.

Alternatively, the movement detection module 102 may be other sensors or detectors arranged to detect or monitor the movement of the testing points 104, whether or not the sensors or detectors are deploy at the same position of the testing points 104 on the testing layers 106.

In this embodiment, in order to detect the movement of the testing points 104 on different testing layers 106 in the structure 108, the movement detection module 102 includes a plurality of detectors each positioned at the testing point 104 on each of the plurality of layers 106 and arranged to detect the movement of the testing point 104 on each of the plurality of testing planes 106. For example, a total of N detectors 102 or accelerometers may be deployed in N different layers 106, in which a single detector 102 may be deployed at each of the testing layers 106.

According to an exemplary embodiment of the present invention, in a detection session, the number N and the positions of testing layer 106 are defined according to the study of the modal order and with reference to the a conventional study of a translational vibration mode. At each of the testing layer 106, a movement detection module 102, such as a multi-axis (such as two-axis or three-axis) accelerometer or a plurality of (or two) orthogonally configured single-axis accelerometer, may be deployed at a position distanced from the centroid 110 of cross-section and as far as possible from a main axial direction of the cross-section of the structure 108, in which the two testing axes of the accelerometer 102 are parallel to the two main axes of the translational vibration mode of the tested structure 108 (as for bridges, for example, the movement detection module may be mounted to a position distanced from a center position of the deck and above the deck with a frame).

The deployed movement detection modules 102 or accelerometers are arranged to detect a vibration response of the structure under an environmental excitation and/or a manual excitation. For each of the n (where n=1, 2, 3, ..., N) testing layers 106, the distance between the testing point 104 and the centroid 110 of the cross-section with respect to each of the testing axes (i.e. $L_1(n)$ and $L_2(n)$) and an angle $\alpha(n)$ of a connection from the centroid 110 to the testing point 104 with respect to one the testing axes (such as axis X as shown in the Figure) is obtained, i.e. a direction of the movement of the testing point 104 is represented as an angle defined by both a predetermined reference direction with respect to the individual centroid 110 and a shortest distance between the testing point 104 and the individual centroid 110 of the respective layer 106 along the testing plane.

Preferably, the data associated with the movement of the testing points 104 may be further processed by a processing module 102 of the system 100 in accordance with an embodiment of the present invention. The processing module 102 may be implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

In an exemplary embodiment, the processing module 102 may be implemented with a server arranged to operate, at least in part if not entirely, the system for performing modal analysis on a structure in accordance with one embodiment of the invention. The server comprises suitable components necessary to receive, store and execute appropriate computer instructions. The components may include a processing unit, read-only memory (ROM), random access memory (RAM), and input/output devices such as disk drives, input devices such as an Ethernet port, a USB port, etc. Display such as a liquid crystal display, a light emitting display or any other suitable display and communications links. The server includes instructions that may be included in ROM, RAM or disk drives and may be executed by the processing unit. There may be provided a plurality of communication links which may variously connect to one or more computing devices such as a server, personal computers, terminals, wireless or handheld computing devices. At least one of a plurality of communications link may be connected to an external computing network through a telephone line or other type of communications link.

The server may also include storage devices such as a disk drive which may encompass solid state drives, hard disk drives, optical drives or magnetic tape drives. The server may use a single disk drive or multiple disk drives. The server may also have a suitable operating system which resides on the disk drive or in the ROM of the server.

The system 100 may also include a database residing on a disk or other storage device which is arranged to store at least one record. The database is in communication with the server with an interface, which is implemented by computer software residing on the server. Alternatively, the database may also be implemented as a stand-alone database system in communication with the server via an external computing network, or other types of communication links.

Alternatively, the processing module 102 may comprises processing unit such as but not limited to a central processing unit (CPU), a physics processing unit (PPU), an Application-specific integrated circuit (ASIC), a field-programmable gate array (FPGA), a microprocessor, or any other processing unit or processor dedicated for performing modal analysis on a structure 108 in accordance with one embodiment of the invention.

Figure 4:
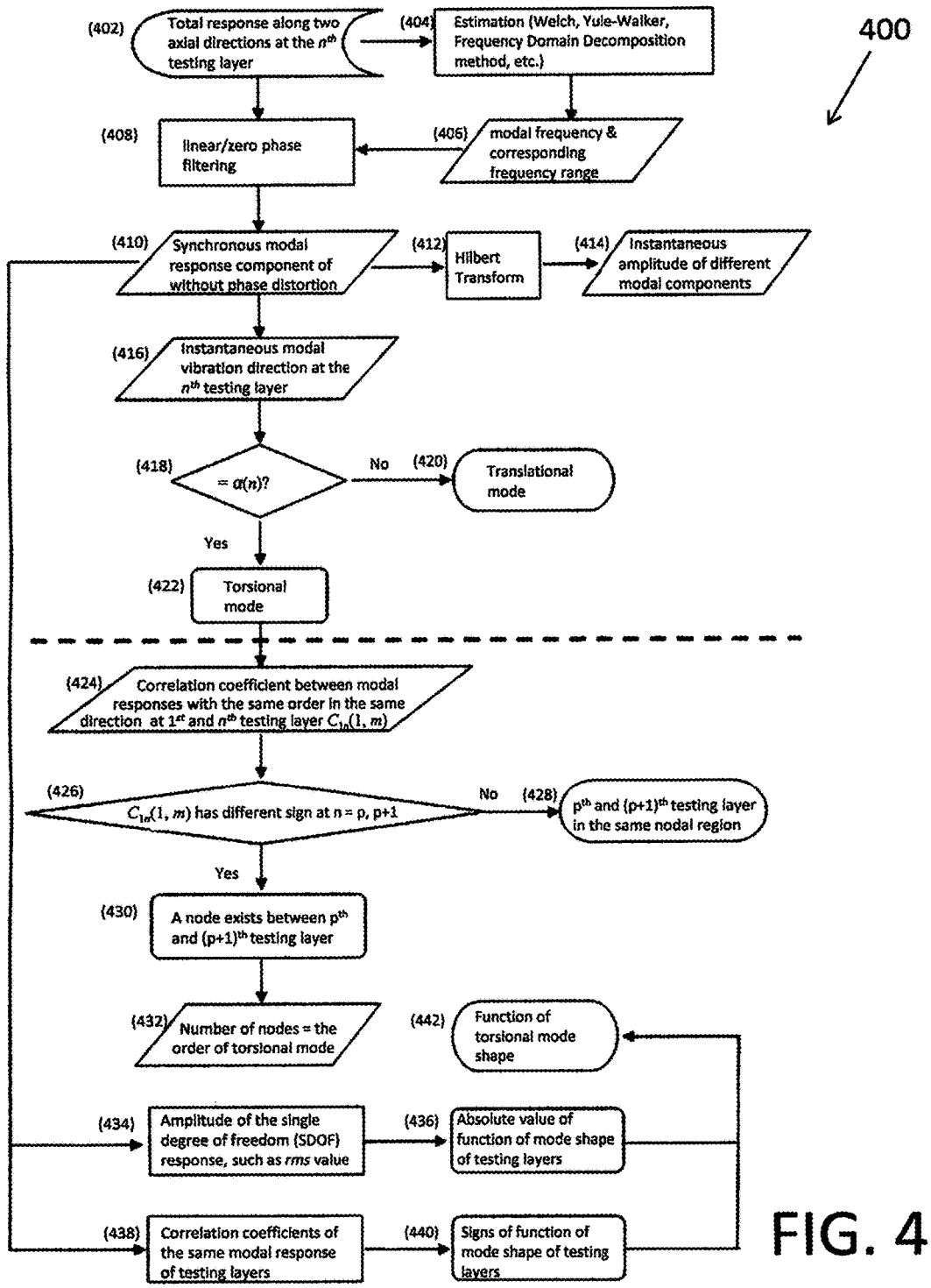
FIG. 4 is a flow diagram showing steps of a method for performing modal analysis on a structure in accordance with one embodiment of the present invention.

With reference to FIG. 4, the data obtained in the detection session may be analyzed in accordance with a method as shown in the following examples. The data representing the total responses along the two axial directions at each of the n testing layer 106 is obtained at step 402, then the modal frequency and the corresponding frequency range are obtained based on the obtained data and an estimation at step 404 such as Welch Estimation or Yukle-Walker Estimation (which may be obtained by using the functions in Pyulear Library in Matlab), Frequency Domain Decomposition method, or any other estimation method as appreciated by a skilled person in the art. Based on the modal frequency range obtained and after filtering each of the response signals along different directions at different testing layer 106, Single Degree of Freedom (SDOF) response components under different modes are obtained at step 406.

Preferably, the processing module 102 is arranged to apply a linear/zero phase filtering so as to obtain the plurality of modal components at step 408. The filtering process involve linear phase or zero phase filtering, to ensure that the time response signals of the SDOF response components are strictly synchronous and without phase distortion. Linear phase filters may include Finite Impulse Response (FIR) band-pass filter, with a characteristic that a predetermined lag time $t_0$ exists in the filtered signal when compared with the original signal, in which:

$$t_0 = d\phi/dm \quad (1)$$

where $d\phi/dw$ is defined as the slope of the phase-angle curve within the band-pass region. With suitable selection of the order of the FIR filter, it is possible to obtain a constant slope in the phase-angle curve within the band-pass region (i.e. equation (1) has a constant value within the whole band-pass region). Therefore, after linear phase filtering, synchronous SDOF response in the time domain without phase distortion may be obtained at step 410 by left shifting the filtered signal with $t_0$ along the time axis.

Alternatively, zero phase filtering involves the following steps: filtering the input signal sequences; inverting the filtered signal in time domain; filtering the inverted signal a second time; and inverting the signal filtered twice in time domain. Such filtering technique may use FIR filters or Infinite Impulse Response (IIR) filters (which may be implemented with the functions in filtfilt Library in Matlab).

Each of the modal component obtained by filtering is denoted as $x(n, i, m, t)$, $n=1, N$ which represents the different testing layers 106, $i=1, 2$ which represents testing directions X and Y as shown in FIGS. 2 and 3, $m=1, 2, 3, \ldots$ which represent the mode order recognized in the estimation, and t represents time. The instantaneous vibration amplitude of the modal response components along different direction in different testing layers 106 may be obtained at step 414 by processing $x(n, i, m, t)$ with Hilbert Transform at step 412 (which may be implemented with the functions in hilbert Library in Matlab).

The processing module 102 is further arranged to determine a plurality of instantaneous vibration directions of the testing point 104 on each of the plurality of layers 106 of the structure 108 at step 416. The plurality of instantaneous vibration directions are determined based on processing a plurality of modal components of the modal response obtained in the testing point 104 on each of the plurality of layers 106. For example, the corresponding instantaneous vibration direction angle θ of different modal components at different testing layer 106 may be determined by the following trigonometric equations:

$$\theta(n, m, t) = \begin{cases} \arctan[x(n, 1, m, t)/x(n, 2, m, t)], \\ \quad \text{for } x(n, 1, m, t) \cdot x(n, 2, m, t) \geq 0; \\ \pi + \arctan[x(n, 1, m, t)/x(n, 2, m, t)], \\ \quad \text{for } x(n, 1, m, t) \cdot x(n, 2, m, t) < 0. \end{cases} \quad (2)$$

the second testing axis in the above equation is zero degree, and clockwise direction is considered as positive. In addition, θ and π+θ both represent a same vibration direction, i.e. the range of θ is [0,π).

Preferably, whereupon a track of movement of at least one of the plurality of modal components renders a steady linear/arc distribution and the corresponding instantaneous vibration direction of the testing point 104 equals to the angle or represents a harmonious vibration with respect to the angle as a center value, the processing module 102 is arranged to identify the movement of the structure 108 as the torsional mode of the movement.

At steps 418, 420 and 422, torsional mode may be identified as follows with reference to FIGS. 3 and 4 and based on the above data analysis. Firstly, torsional mode and swaying mode (transitional mode) are identified. When compared with swaying mode, torsional mode has a special form of vibration, i.e. the testing points 104 vibrate harmoniously around torsional center along a direction perpendicular to the connection (or the shortest distance) between the testing point 104 and the torsional center. In an exemplary situation, the centroid 110 of (a layer of) an object/structure 108 is generally presumed to be not distanced away from the torsional center, as a result, it may be considered that the testing points 104 vibrate harmoniously around the centroid 110 under torsional mode. The torsional mode may be identified based on the above features and further explained as follows.

In a situation with smaller vibration amplitude (e.g. less than 5°), the trace of movement corresponding to the torsional mode shows a linear distribution, the instantaneous vibration direction angle θ(t) has a certain value, and θ(n)=α(n). In a situation with greater vibration amplitude (e.g. greater than 5°), the trace of movement corresponding to the torsional mode shows an arc distribution, the instantaneous vibration direction angle moves with respect to α as a center of vibration. Considering the actual eccentricity effect of the torsional center and the centroid, and the interference of the testing noise when the torsional mode vibration amplitude is small, there exists a certain degree of deviation and divergence between the obtained and theoretical trace of movement and instantaneous vibration direction angle, but the vibration will still has a center value of θ and a very similar angle α, while the center value and angle α of the instantaneous vibration in a swaying mode are different from those in a torsional mode. Therefore, torsional mode may be determined by comparing relationship between the center value of the instantaneous vibration direction angle and the corresponding angle α of the testing points 104, combining with analysis of the divergence of the instantaneous vibration direction angle with respect to the center value and the shape of the trace of movement.

Whereupon the torsional mode of the movement of the structure is identified, the processing module 102 is further arranged to determine a torsional duration and an instantaneous amplitude information by computing a linear response corresponding to a radius of the movement of the testing point 104 on each of the plurality of layers 106.

Subsequently, the order of torsional mode, the mode shape and the torsional angle may be determined from steps 424 to 442. For a first order torsional mode, the phase of the same modal response of different testing layers in the same testing direction is the same, or the correlated coefficient $C_{pq}(i,m)$ corresponding to the time domain response is positive and close to 1, or is equal 1 in the following equation:

$$C_{pq}(i,m) \equiv \mathrm{corr}[x(p,i,m,t), x(q,i,m,t)]. \tag{3}$$

where corr [ ] is the operation of the correlation coefficient of the two time sequence x(q, i, m, t) and x(q, i, m, t).

For a second or higher torsional mode, the region between any two neighbouring nodes is denoted as a nodal segment. The modal response of any two testing points along a same testing direction and within a nodal segment have a same phase, or a correlation coefficient corresponding to the time domain response close to 1. The modal response of any two sides along the same testing direction in two adjacent nodal segments has an opposite phase (a 180° difference), or the correlation coefficient $C_{pq}(i,m)$ corresponding to the time domain response close to −1. As a result, the existence and the position of a node between two adjacent testing layers may be determined at step 430 according to the signs of the $C_{pq}(i,m)$, and the order of the torsional mode may be further determined by the number of nodes at step 432.

Preferably, the amplitude of the function of the torsional mode shape represents an amplitude of the modal response corresponding to each of the radius of the movement of the testing point 104 on each of the plurality of layers 106.

Some sensors or detectors 102 may only be configured to detect a translational vibration (such as transitional displacement, transitional velocity, transitional acceleration, etc) but not an angular vibration directly. In another exemplary testing procedure according to an embodiment of the present invention, the angular response φ(n, i, m, t) corresponding to the torsional mode may be determined by the following equation:

$$\phi(n,i,m,t) = x(n,i,m,t)/L_i. \tag{4}$$

and Φ(n, i, m)≡ sign [$c_{rn}(i,m)$]·std[φ(n, i, m, t)], in which sign [ ] is the sign function, r represent a reference testing layer, which may be selected as the top testing layer (i.e. r=N), n is the current testing layer, n=1, 2, 3, . . . , N representing different testing layers 106, std[φ(n, i, m, t)] represents an root-mean-square value of the sequence φ(n, i, m, t). For torsional mode, since φ(n, 1, m, t)=φ(n, 2, m, t), sign [$C_{rn}(1,m)$]=sign [$C_{rn}(2,m)$], hence Φ(n, 1, m)=Φ(n, 2, m) and i in Φ(n, i, m) may be omitted and is denoted as Φ(n,m). Therefore, the mode shape function corresponding to the torsional mode may be represented as a dimensionless matrix Φ(n,m), wherein the absolute value of the φ(n,m) element represents an amplitude of the mode shape at step 436, the sign represents the direction of the mode shape at step 440 (i.e. same direction (+) or opposite direction (−) with respect to the reference testing layer). Accordingly, the number of nodes is obtained by summation of identified nodes represented by a same order of modal component of two of the plurality of testing points 104 in a same direction if the two testing points 104 includes opposite phases or a negative correlation coefficient of a modal response in time domain.

Advantageously, when compared with some other torsional mode identification methods, the embodiments in accordance with the present invention may provide an effective way for identifying torsional vibration mode of an object based on real-time testing data, and also for determining the positions of nodes and the order of torsional mode vibration, obtaining a corresponding mode shape function, as well as the time response and the instantaneous amplitude of torsional vibration mode of the object. In addition, the testing procedure is simple, easy to operate, low cost, and avoid inconvenient testing methods such as by deploying symmetrical testing points for testing.

These embodiments are especially advantageous in the identification of torsional vibration mode and the associate analysis of the vibration in tall buildings, marine platform, bridges and any other architectural structures.

Without deviating from the spirit of the invention, the system and method for performing modal analysis can be implemented to analyse any architectural structure, or any other object that may experience vibration and may requires modal analysis.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for performing modal analysis on a structure comprising the steps of:
   dividing the structure into a plurality of layers each having an individual centroid;
   deploying a detector at a single testing point on each of the plurality of layers, the detector being arranged to detect a vibration or a movement, wherein the single testing point is at a predetermined distance from the individual centroid along a testing plane, and wherein the vibration or the movement is determined by detecting at least two orthogonal testing directions of the single testing point on each of the plurality of layers of the structure;
   upon detecting the vibration of the structure under an environmental excitation and/or a manual excitation, determining a movement of the single testing point on each of the plurality of layers with respect to the individual centroid of the plurality of layers
   processing the movement of the single testing point on each layer to determine a modal response of the structure;
   identifying a torsional mode and a swaying mode of a movement of the structure;

wherein processing the movement of the single testing point on each layer includes: determining a plurality of instantaneous vibration directions of the single testing point on each of the plurality of layers and determining a plurality of instantaneous vibration amplitudes corresponding to the single testing point on each of the plurality of layers, and processing a plurality of modal components of the modal response obtained in the single testing point on each of the plurality of layers.

2. A method for performing modal analysis on a structure in accordance with claim 1, wherein the plurality of modal components are synchronous and without phase distortion.

3. A method for performing modal analysis on a structure in accordance with claim 1, wherein the plurality of modal components are obtained by applying a linear/zero phase filtering.

4. A method for performing modal analysis on a structure in accordance with claim 1, wherein the plurality of instantaneous vibration amplitudes are determined by applying Hilbert Transform to each of the plurality of modal components.

5. A method for performing modal analysis on a structure in accordance with claim 1, wherein a direction of the movement of the testing point is represented as an angle defined by both a predetermined reference direction with respect to the individual centroid and a shortest distance between the testing point and the individual centroid of the respective layer along the testing plane.

6. A method for performing modal analysis on a structure in accordance with claim 5, whereupon a track of movement of at least one of the plurality of modal components renders a steady linear/arc distribution and the corresponding instantaneous vibration direction of the testing point equals to the angle or represents a harmonious vibration with respect to the angle as a center value, identifying the movement of the structure as the torsional mode of movement.

7. A method for performing modal analysis on a structure in accordance with claim 6, whereupon identifying the torsional mode of the movement of the structure, determining a torsional duration and an instantaneous amplitude information by computing a linear response corresponding to a radius of the movement of the testing point on each of the plurality of layers.

8. A method for performing modal analysis on a structure in accordance with claim 7, further comprising the step of representing an amplitude of a function of a torsional mode shape by an amplitude of the modal response corresponding to each of the radius of the movement of the testing point on each of the plurality of layers.

9. A method for performing modal analysis on a structure in accordance with claim 8, wherein the sign of the amplitude of a function of a torsional mode shape represents a sign of a correlation coefficient of the modal response in time domain associated with a referenced testing point and a plurality of different testing points on different testing planes.

10. A method for performing modal analysis on a structure in accordance with claim 7, further comprising the step of determining an order of the torsional mode of the movement by identifying a number of nodes.

11. A method for performing modal analysis on a structure in accordance with claim 10, wherein the number of nodes is obtained by summation of identified nodes represented by a same order of modal component of two of the plurality of testing points in a same direction if the two testing points includes opposite phases or a negative correlation coefficient of a modal response in time domain.

12. A system for performing modal analysis on a structure comprising:
a movement detection module arranged to determine a movement of a single testing point on each of a plurality of layers divided in a structure with respect to an individual centroid of each of the plurality of layers, wherein the testing point is at a predetermined distance from the individual centroid along a testing plane; and
a processing module arranged to process the movement of the testing point on each layer to determine a modal response of the structure;
wherein the movement detection module includes a plurality of detectors, with one of said plurality of detectors deployed at each testing point on each of the plurality of layers, and arranged to detect the movement of the testing point on each of the plurality of layers upon detecting a vibration of the structure under an environmental excitation and/or a manual excitation, the vibration and/or the movement is determined by detecting at least two orthogonal testing directions of the single testing point on each of the plurality of layers of the structure; and
wherein the processing module is arranged to determine the movement of the testing point by determining a plurality of instantaneous vibration directions of the testing point on each of the plurality of layers and determining a plurality of instantaneous vibration amplitudes corresponding to the testing point on each of the plurality of layers, and to process a plurality of modal components of the modal response obtained in the single testing point on each of the plurality of layers; and wherein the processing module is further arranged to identify a torsional mode and a swaying mode of a movement of the structure.

13. A system for performing modal analysis on a structure in accordance with claim 12, wherein the testing point on each of the plurality of layers is a single testing point.

14. A system for performing modal analysis on a structure in accordance with claim 12, wherein the movement detection module includes a multi-axis accelerometer.

15. A system for performing modal analysis on a structure in accordance with claim 12, wherein the movement detection module includes a plurality of single-axis accelerometer orthogonally configured with respect to each other.

16. A system for performing modal analysis on a structure in accordance with claim 12, wherein the movement detection module includes a plurality of detectors each positioned at the testing point on each of the plurality of layers and arranged to detect the movement of the testing point on each of the plurality of testing planes.

17. A system for performing modal analysis on a structure in accordance with claim 12, wherein the plurality of modal components are synchronous and without phase distortion.

18. A system for performing modal analysis on a structure in accordance with claim 12, wherein the processing module is arranged to apply a linear/zero phase filtering so as to obtain the plurality of modal components.

19. A system for performing modal analysis on a structure in accordance with claim 12, wherein the processing module is arranged to apply Hilbert Transform to each of the plurality of modal components so as to determine the plurality of instantaneous vibration amplitudes.

20. A system for performing modal analysis on a structure in accordance with claim 12, wherein a direction of the movement of the testing point is represented as an angle defined by both a predetermined reference direction with respect to the individual centroid and a shortest distance between the testing point and the individual centroid of the respective layer along the testing plane.

21. A system for performing modal analysis on a structure in accordance with claim 20, whereupon a track of movement of at least one of the plurality of modal components renders a steady linear/arc distribution and the corresponding instantaneous vibration direction of the testing point equals to the angle or represents a harmonious vibration with respect to the angle as a center value, the processing module is arranged to identify the movement of the structure as the torsional mode of the movement.

22. A system for performing modal analysis on a structure in accordance with claim 21, whereupon the torsional mode of the movement of the structure is identified, the processing module is further arranged to determine a torsional duration and an instantaneous amplitude information by computing a linear response corresponding to a radius of the movement of the testing point on each of the plurality of layers.

23. A system for performing modal analysis on a structure in accordance with claim 22, wherein an amplitude of a function of a torsional mode shape represents an amplitude of the modal response corresponding to each of the radius of the movement of the testing point on each of the plurality of layers.

24. A system for performing modal analysis on a structure in accordance with claim 23, wherein the sign of the amplitude of a function of a torsional mode shape represents a sign of a correlation coefficient of the modal response in time domain associated with a referenced testing point and a plurality of different testing points on different testing planes.

25. A system for performing modal analysis on a structure in accordance with claim 22, wherein the processing module is further arranged to determine an order of the torsional mode of the movement by identifying a number of nodes.

26. A system for performing modal analysis on a structure in accordance with claim 25, wherein the number of nodes is obtained by summation of identified nodes represented by a same order of modal component of two of the plurality of testing points in a same direction if the two testing points includes opposite phases or a negative correlation coefficient of a modal response in time domain.

27. A system for performing modal analysis on a structure in accordance with claim 12, wherein the structure includes an architectural structure.

* * * * *